July 13, 1943.                W. K. BECKWITH                2,324,130
                                  CHUCK
                          Filed Jan. 21, 1942
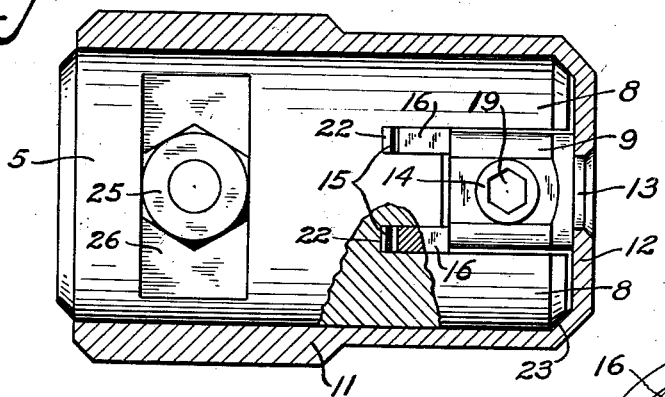
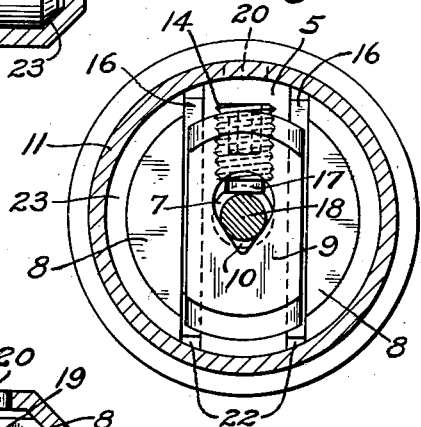
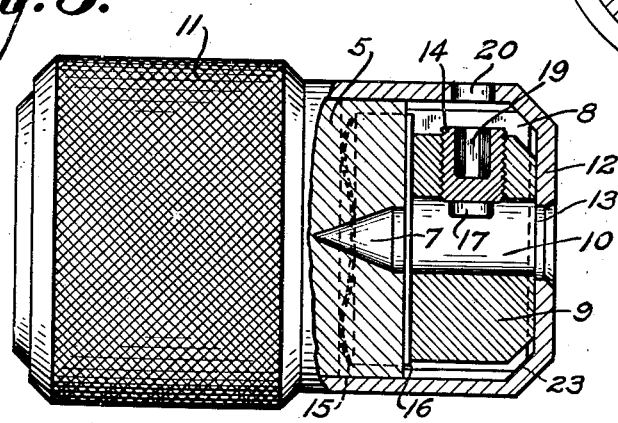
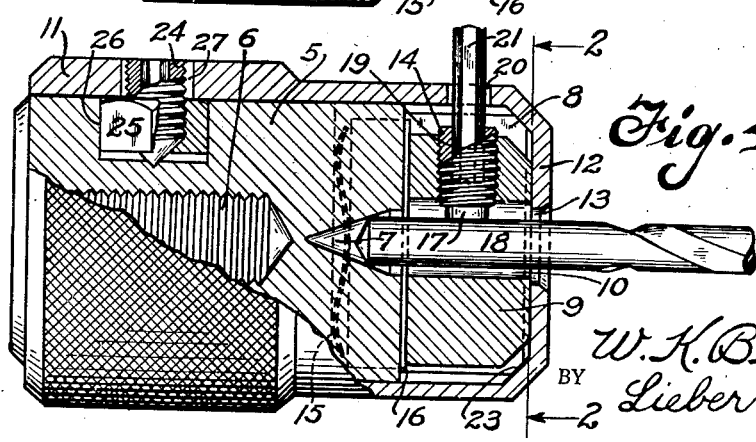
INVENTOR.
W. K. Beckwith
BY Lieber & Lieber
ATTORNEYS.

Patented July 13, 1943

2,324,130

UNITED STATES PATENT OFFICE 2,324,130

CHUCK

Wendell K. Beckwith, Whitewater, Wis., assignor to Milwaukee Electric Tool Corporation, Milwaukee, Wis., a corporation of Wisconsin Application January 21, 1942, Serial No. 427,633

5 Claims. (Cl. 279—18)

This invention relates in general to improvements in devices for firmly but detachably connecting two machine elements, and relates more specifically to improvements in the construction and operation of chucks for connecting round shank tools such as drills to their supports or driving spindles.

An object of the invention is to provide an improved chuck which is simple in construction and efficient in operation.

I have heretofore proposed a tool chuck for drills and other tools having round shanks, comprising a driving member having a tapered central recess for receiving the end of a tool shank and parallel guideways extending transversely across the open end of the recess, a block snugly fitting the guideways but freely slidable therebetween and provided with an opening of V-shaped cross-section extending away from the tapered recess, a collar detachably secured to the driving member and having an end wall coacting with the block to retain the same within the guideways, and a set screw carried by the block entirely within the collar for clamping the tool shank within the V-shaped side portion of the block opening. While this prior chuck was quite satisfactory if the outer face of the sliding block was in snug coaction with the end wall of the collar when the tool shank was pressed into the tapered recess of the driving member and the clamping set screw was manipulated to clamp the tool shank, I have found that extreme care must be exercised to meet these conditions and that the tool would not be properly centered if any clearance existed between the block and end wall when final clamping was effected. I have also discovered that the chuck would not properly center the tools if the transverse guideways were not accurately centered with respect to the central recess in the driving member since the block was in snug sliding coaction with these parallel guideways; and that when the sliding clearance is materially increased so that the guideways merely serve to prevent rotation of the block relative to the driving member, less accurate machining of these parts is required and improved operation of the chuck assemblage results.

It is therefore an object of the present invention to provide an improved round shank tool chuck of the above described type, which obviates all of the difficulties encountered in the construction and operation of the prior chucks, and which can be more readily manufactured and manipulated to produce most efficient chucking.

Another specific object of my present invention is to provide simple and effective means for constantly urging the tool clamping block into snug engagement with a stop surface on its retaining collar in a chuck of the above defined type, so that accurate centering and clamping of the tools in the chuck may be effected quickly and without undue care.

A further specific object of the invention is to provide an improved chuck of the above described type, wherein the usual snugly fitted sliding tool clamping block is replaced by a rotation preventing key, and in which the coacting elements can be properly machined and assembled at minimum cost.

Still another specific object of my invention is to provide an improved round shank tool chuck which is durable and compact in construction, which can be manufactured in extremely small or larger sizes at moderate cost, and in which the tool clamping and driving block can be shifted by the working pressure to automatically center the tool.

These and other specific objects and advantages of the invention will be apparent from the following detailed description.

A clear conception of the several features comprising the present improvement, and of the construction and operation of a chuck built in accordance with the invention, may be had by referring to the drawing accompanying and forming a part of this specification wherein like reference characters designate the same or similar parts in the various views.

Fig. 1 is a partial central longitudinal section through the chuck showing the parts assembled and ready for the reception of a tool;

Fig. 2 is a transverse section through the chuck taken along the line 2—2 of Fig. 4;

Fig. 3 is another partial longitudinal section through the chuck assemblage taken at right angles to the plane of section of Fig. 1; and Fig. 4 is a longitudinal section similar to that of Fig. 3, but showing a round shank drill being applied to the chuck.

Although the invention has been shown and described herein as having been applied to a rotary round shank tool chuck co-operating with a standard twist drill, it is not my desire or intention to thereby unnecessarily restrict the scope or utility of the improvement.

The improved round shank tool chuck shown in the drawing, comprises in general an approximately cylindrical body or driving member 5 having a threaded socket 6 at one end formed for attachment to a driving or supporting spindle, and being provided at its opposite end with a central tapered or conical recess 7 and with integral spaced walls 8 extending across the member 5 on opposite sides of the tapered recess 7; a clamping element or prismatic block 9 freely movable across the open end of the recess 7 between the walls 8 and being pierced by a V-sided opening 10 extending outwardly away from the recess 7; a substantially cylindrical sleeve or retaining collar 11 snugly embracing and detachably secured to the body member 5 and having an outer end wall 12 provided with a central hole 13 disposed in axial alinement with the tapered recess 7 on the opposite side of the block 9; a clamping set screw 14 having screw thread coaction with the block 9 and being disposed entirely within the collar 11; and spring means consisting of a pair of leaf springs 15 and parallel slides 16 interposed between the member 5 and the inner face of the block 9 for constantly urging the outer face of the latter against the inner surface of the sleeve wall 12.

The body member 5 is preferably formed of a solid block of metal and the socket 6 and recess 7 thereof should be disposed in perfect axial alinement with each other, while the integral walls 8 may be disposed approximately equi-distant from the axis of the recess 7. The prismatic block 9 is likewise preferably formed of a single piece of metal and while the outer face of this block should be accurately formed perpendicular to the V-sided opening 10, the width of the block may be considerably less than the distance between the walls 8 of the member 5, the length of the block should be considerably less than the internal diameter of the retaining collar 11, and the height of the block may be somewhat less than the distance from the outer end of the recess 7 to the inner surface of the wall 12. The movable block is thus freely movably confined entirely within the enclosing collar 11 and loosely between the spaced walls 8, and because of this loose fit the walls 8 and the opposite side surfaces of the block 9 need not be accurately machined since a snug sliding fit between these surfaces is not necessary. The elongated opening 10 which pierces the block 9 is preferably formed as shown in Figs. 2, 3 and 4 with the V-side thereof remote from but in axial alinement with the nose or point 17 of the set screw 14 so that the round shank 18 of a twist drill or other tool may be firmly clamped against the V-side of the opening 10 by manipulation of the clamping screw 14. The outer end of the set screw 14 has a polygonal socket 19 disposed in axial alinement with a hole 20 formed in the collar 11, and a polygonal ended wrench 21 may be inserted into the set screw socket 19 through the hole 20 as illustrated in Fig. 4, in order to clamp and to release the tool shank 18 from the exterior of the casing collar 11.

The enclosing and retaining collar 11 is preferably formed of a single piece of metal and may be knurled as shown in Figs. 3 and 4, and the concealed block 9 is constantly urged into intimate sliding engagement with the inner surface of the collar end wall 12 by means of the springs 15 coacting with the parallel elongated slides 16. Any other suitable means for urging the block 9 outwardly away from the open end of the tapered recess 7 may be employed, but it is preferable to use a spring for this purpose and leaf springs interposed between the member 5 and the block 9 provide a compact assemblage. In order to more uniformly distribute the resilient pressure on the clamping block 9, the elongated slides 16 are provided and these slides are freely slidably confined in transverse slots 22 formed in the driving member 5 contiguous with the inner side surfaces of the spaced walls 8. As previously indicated, the internal bore of the collar 11 snugly engages the outer cylindrical surface of the driving member 5, and the portion of the enclosing sleeve which connects the end wall 12 with the cylindrical outer wall thereof may be tapered to fit a chamfered surface 23 formed at the outer extremities of the spaced walls 8. The collar 11 is devoid of direct screw thread attachment to the driving member 5, but is drivingly connected thereto by means of one or more set screws 24 having screw thread coaction with standard polygonal nuts 25 as shown in Figs. 1 and 4. These nuts 25 are confined within the collar 11 in transverse slots 26, and the set screws 24 project outwardly from the adjacent nuts 25 and into openings 27 formed in the collar 11. The set screws 24 are preferably of the same size and are interchangeable with the clamping set screw 14, but one of these set screws preferably has a relatively flat nose 17 while another is preferably provided with a pointed nose, so that interchange of the several types of screws will facilitate attachment or drills having shanks 18 of different diameters. The transverse slots 26 also serve as wrench slots for effecting attachment of the body 5 to the driving spindle, and removal therefrom.

When the chuck has been properly constructed and assembled as shown in Figs. 1 and 3, the structure is ready for the reception of drills or other rotary tools having shanks 18 of diverse diameters. In order to apply a tool shank 18 to the chuck, the wrench 21 should first be inserted in the set screw 14 and manipulated to retract this screw away from the V-sided opening 10. The tool shank 18 may then be freely inserted through the hole 13 and block opening 10 so that the shank end will engage the tapered recess 7 as shown in Fig. 4, whereupon the wrench 21 should again be manipulated to cause the nose 17 of the set screw 14 to clamp the tool shank 18 firmly against the V-side of the block opening 10, see Figs. 2 and 4. By virtue of the fact that the block 9 is always maintained in snug sliding engagement with the inner surface of the end wall 12 and as far as possible away from the open end of the tapered recess 7, the tool shank 18 after having been clamped in the opening 10 while the shank is in proper contact with the tapered surface of the recess 7, cannot shift laterally or wabble when working pressure is applied to the opposite end of the drill, and this is an important feature of the present invention. Previous chucks of this general type have failed because of the absence of means for resiliently urging the block 9 against a positive outer stop, so that the block could not be shifted inwardly in these prior chucks to properly seat the shank end within the centering recess 7 when working pressure was applied to the tool, and in case any clearance existed between the shank end and the recess 7 when such working pressure was actually applied. It has also been found that if the set screw 14 is driven home so as to firmly clamp the shank 18 into the V-side of the opening 10, the block 9 need not be snugly slidably confined between the inner surfaces of the walls 8, and when driving force is applied the loosely confined block 9 will rotate slightly so as to drivingly engage the walls 8. This loose fit makes it unnecessary to accurately machine the adjacent side surfaces of the walls 8 and block 9, thereby facilitating manufacture and minimizing the cost of construction. The tool shank 18 may obviously be readily removed from the chuck by again utilizing the wrench 21, and this wrench 21 may also be used to remove the set screws 24 in case it becomes desirable to completely dismantle the chuck assemblage.

From the foregoing detailed description it should be apparent that my present invention provides an improved round shank tool chuck which is extremely simple, compact and durable in construction, and which is furthermore conveniently manipulable and highly efficient in use. The improved chuck assemblage comprises relatively few readily machineable parts, and will function to retain the driven tools accurately centered even if these tools are negligently applied, by virtue of the resilient reaction surface which has been provided for the shank clamping block 9. This resilient mounting or the provision of resilient means for constantly urging the block 9 away from the recess 7 is very important in the construction of a practical and commercial chuck of this type, as it insures proper operation of the device even if the operator is careless in initially inserting the tool, and the resilient means or spring may obviously assume various forms. The loose fit between the movable clamping block 9 and the side walls 8 of the driving member 5 is also important since it reduces the cost of construction to a minimum by making it unnecessary to accurately machine all of the coacting surfaces;; and the improved chuck assemblage has proven highly successful in actual use and will co-operate with tool shanks of various diameters.

It sholuld be understood that it is not desired to limit this invention to the exact details of construction or to the precise mode of use of the chuck herein shown and described, for various modifications within the scope of the appended claims may occur to persons skilled in the art.

I claim:

1. In a chuck, a driving member having one end formed for attachment to a support and its opposite end provided with a central tapered recess and spaced walls extending across the member on opposite sides of the open end of said recess, a block movable across the open end of said tapered recess between said walls and being pierced by a V-sided opening extending away from the recess, a collar secured to said driving member and having an end wall provided with a hole disposed in axial alinement with said recess but on the opposite side of the block, a clamping set screw carried by said block entirely within said collar, and resilient means for constantly urging said block away from said tapered recess and against said end wall of the collar.

2. A chuck as per claim 1, characterized thereby, that the resilient means for constantly urging the block away from the tapered recess and against the end wall of the collar coacts with the block on opposite sides of the tapered central recess.

3. A chuck as per claim 1, characterized thereby, that the resilient means for constantly urging the block away from the tapered recess and against the end wall of the collar coacts with the driving member on opposite sides of the central tapered recess therein.

4. A chuck as per claim 1, characterized thereby, that the resilient means for urging the block away from the tapered recess is a spring interposed between the driving member and the block.

5. A chuck as per claim 1, characterized thereby, that the resilient means for urging the block away from the tapered recess coacts with the block through parallel slides which coact with guideways formed in the driving member on opposite sides of the tapered recess therein.

WENDELL K. BECKWITH.